United States Patent

[11] 3,595,538

| | | |
|---|---|---|
| [72] | Inventor | Edward J. Baumann<br>Beloit, Wis. |
| [21] | Appl. No. | 826,601 |
| [22] | Filed | May 21, 1969 |
| [45] | Patented | July 27, 1971 |
| [73] | Assignee | Beloit Passavant<br>Janesville, Wis. |

[54] FLOATING AERATION ROTOR
3 Claims, 4 Drawing Figs.

[52] U.S. Cl. ..................................................... 261/92,
261/120, 210/242
[51] Int. Cl. ....................................................... B01f 3/04
[50] Field of Search .............................................. 261/92,
120; 210/242; 239/188—190

[56] References Cited
UNITED STATES PATENTS

| 2,684,941 | 7/1954 | Pasveer | 261/92 X |
| 3,109,875 | 11/1963 | Schramm et al. | 261/92 X |
| 3,208,734 | 9/1965 | Wood et al. | 261/91 |
| 3,320,160 | 5/1967 | Welles, Jr. et al. | 210/242 X |
| 3,322,410 | 5/1967 | Ahlenius | 261/92 X |

FOREIGN PATENTS

| 558,912 | 7/1957 | Belgium | 261/92 |

OTHER REFERENCES

Leopoldseder et al. German Printed Application No. 1,166,104, 10— 57, 261— 92

*Primary Examiner*—Tim R. Miles
*Attorneys*—Dirk J. Veneman, John S. Munday and Gerald A. Mathews ABSTRACT: A floating aeration rotor for use in a basin and having a pair of bladed rotors rotatably mounted in a frame. The blades are powered so as to propel the front blade about the basin and the rotors are guided over a predetermined path on the water.

PATENTED JUL 27 1971 3,595,538

INVENTOR.
EDWARD J. BAUMANN.
BY *Gerald A. Mathews Agent*

FLOATING AERATION ROTOR

BACKGROUND OF THE INVENTION

This invention relates to apparatus for introducing a gas into a liquid and, more particularly, a bladed aeration rotor which rotates in a basin containing waste water to introduce air into the water to facilitate the removal of polluted material. Previous aeration apparatus of the rotor type is designed to operate in cooperation with a basin having a continuous flow path configuration so that the waste water can be circulated past the rotor by means of pump or by the rotor itself, or both acting in combination. The aeration rotor is mounted in a fixed position across a section of the flow channel within the continuous basin. In the case where the bladed rotor alone is producing the current within the basin, several rotors might be required to produce sufficient current to force all of the water to pass beneath each rotor in a cycle period sufficiently short to aerate all of the water in a reasonable time.

Basins utilizing fixed rotors are generally constructed of concrete which means they are relatively small or their cost is relatively high—both conditions being undesirable today where municipalities and corporations are enlarging their facilities for waste treatment.

Certain industries, such as paper mills and petroleum refineries, are faced with the necessity of processing a large quantity of waste fluid each day. This problem is becoming more acute with the passage of laws by local and state governments regulating the extent or degree of processing which must be done.

Small municipalities and processors of large quantities of wastes face a common problem in that neither can easily afford a large investment in settling, flocculation and aeration basins constructed of concrete and steel. They desire an inexpensive, yet efficient, method of treating waste liquid sufficiently to discharge it into rivers and lakes.

SUMMARY OF THE INVENTION

This invention virtually obviates the cost problem by providing a guided aeration rotor floating in a lagoon or basin which itself requires little or no extra preparation thus reducing the capital expenditure to a minimum.

Waste liquid, such as contaminated water from a paper mill, is introduced, or circulated through, a large pond or lagoon, which may be found in nature or produced inexpensively with bulldozers. The lagoon need not be lined with concrete or any other material; the primary requirement is that it be large enough to handle all the effluent produced by the plant per day or week, depending upon the type of waste and its treatment period.

One or more large, powered, horizontally mounted aeration rotors are floated in the lagoon on pontoons. Depending on the size and shape of the lagoon, one or more piers are located within it and connected to the floating rotors with tethering guide cables. It is also contemplated that an alternate guiding method can be provided whereby the piers anchored in the lagoon are replaced with cables strung above the surface from bank to bank in any desired pattern to guide the floating rotor by means of a tethering cable slidably engaging the cables traversing the lagoon.

The rotors then move about the lagoon aerating and mixing the waste water. Unlike fixedly mounted rotors operating in comparable smaller concrete lined basins, the floating rotor does not have to be sized and powered sufficiently to create a current to keep all the liquid in motion to maintain circulation and prevent stagnation. Instead, it moves itself about the basin aerating the liquid and breaking up any accumulations that form. Thus, a larger quantity of liquid can be treated with one floating rotor mounted within a basin and no energy need by expended circulating the liquid. Conversely, a given quantity of liquid can be aerated with fewer floating rotors than fixedly mounted rotors.

A floating rotor mounted to rotate about a horizontal axis can more easily be made larger (longer) than a fixedly mounted rotor revolving about a vertical axis which must extend its blades radially horizontally rather than axially to become larger. The horizontal rotor also has the attendant advantages of sweeping a broader area (by virtue of its lateral, axial size) and being self-propelled—a feature not inherent in a vertically mounted rotor due to the symmetrical area of contact between the blades and liquid about the axis of rotation.

When a pier is anchored in the lagoon to guide the floating rotor, the tethering cable is either of a fixed length or is allowed to wind and unwind inwardly and outwardly about the pier to allow the rotor to sweep a circular area if desired. To aid in the aeration process, a baffle may be mounted on the pontoon frame behind the rotor to project the aerated water beneath the lagoon's surface and serves as a drag to reduce the speed.

A large amount of equipment and special construction such as adjustable mounts to raise and lower the rotor shaft with respect to the water level and concrete lined channels leading to the rotor, as are usually found in installations having fixedly mounted rotors, is not necessary with the floating rotor and capital expenditure is cut to a minimum.

Therefore, it is the primary object of this invention to provide a guided, propelled aeration rotor capable of traveling through, mixing and aerating a large basin of liquid.

A feature of the invention is the elimination of the need for an expensive concrete lined tank and means to adjust the height of the aeration rotor with the respect to the liquid level within the tank.

Other objects, features and advantages of the invention will readily be apparent to those skilled in the art when the attached drawings are viewed in connection with the description of the preferred embodiment.

DESCRIPTION OF THE PREFERRED EMBODIMENT

Figure 1:
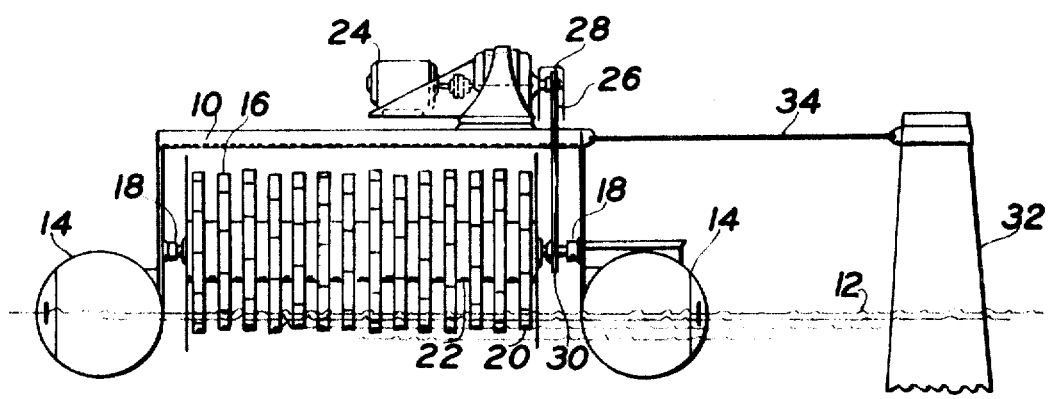
FIG. 1 is a front view of the frame and rotor floating in a basin of liquid.

In FIG. 1, a frame 10 floats in the water 12 of a lagoon supported on a pair of pontoons 14 which can be of any suitable construction. It has been found that steel pipe filled with foamed-in-place polyurethane makes an excellent pontoon which is not adversely affected if punctured.

A large aeration rotor 16 having an axial shaft 22 is rotatably mounted in frame 10 with sealed bearings 18. A plurality of blades 20 extend radially from the center of shaft 22 and dip beneath the surface of water 12.

A motor 24 is mounted on top of frame 10 and is connected to shaft 22 of rotor 16 by means of a continuous drive belt 26 which rotates about pulleys 28, 30 keyed to the motor and rotor shafts, respectively.

The motor causes the bladed rotor to revolve and frame 10 is propelled through the water by the paddle action of the blades. Rotation of the blades also serves the dual, and primary, purpose of purifying the water by projecting air into the liquid to satisfy the oxygen demand of the pollutants.

Frame 10 is tethered to a pier 32 with a guide cable 34. Pier 32 is anchored within the lagoon. Cable 34 is rotatably mounted to pier 32 with a slip ring or other similar means to allow frame 10 to continuously revolve without twisting the cable. It is contemplated, however, that a reeling device (not shown) can be attached to pier 32 to allow cable 34 to be slowly wound in and out so that rotor 16 can sweep over the entire circular area of a specified diameter defined by the cable length.

Pier 32 and cable 34, in addition to guiding the rotor also serve to support the electrical connections (not shown) which connect motor 24 with a source of power on the lagoon's shore.

Figure 2:
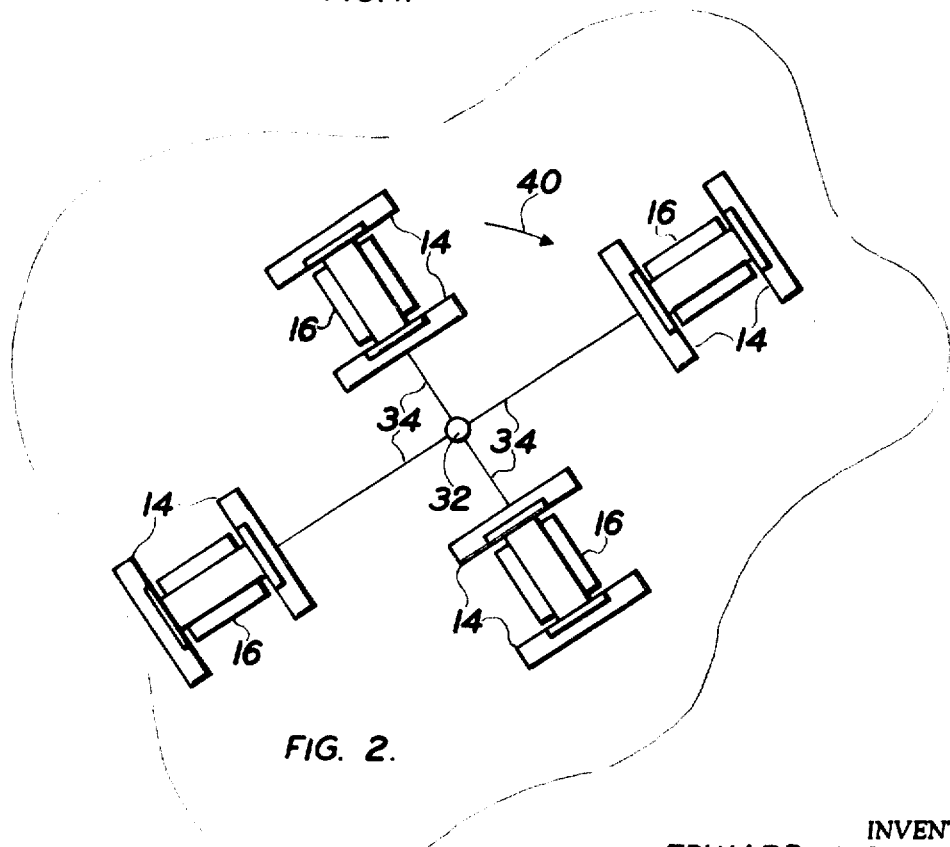
FIG. 2 is a top view of a lagoon in which four frames are floating and rotating around a pier.

FIG. 2 illustrates how several frame mounted rotors can be arrayed to rotate about a single pier. If the lengths of cable 34 are fixed, each pair of diametrically opposite rotors can be positioned at a different distance from the pier so that most or all of a circular area can be swept with each revolution of the rotors. It is anticipated that several piers can be mounted in particularly large lagoons arrayed such that rotors on the ends of their guide cables intermesh like teeth in a pair of gear wheels. The rotors and guide cables projecting from each pier are positioned and initially spaced to avoid contact.

Figure 3:
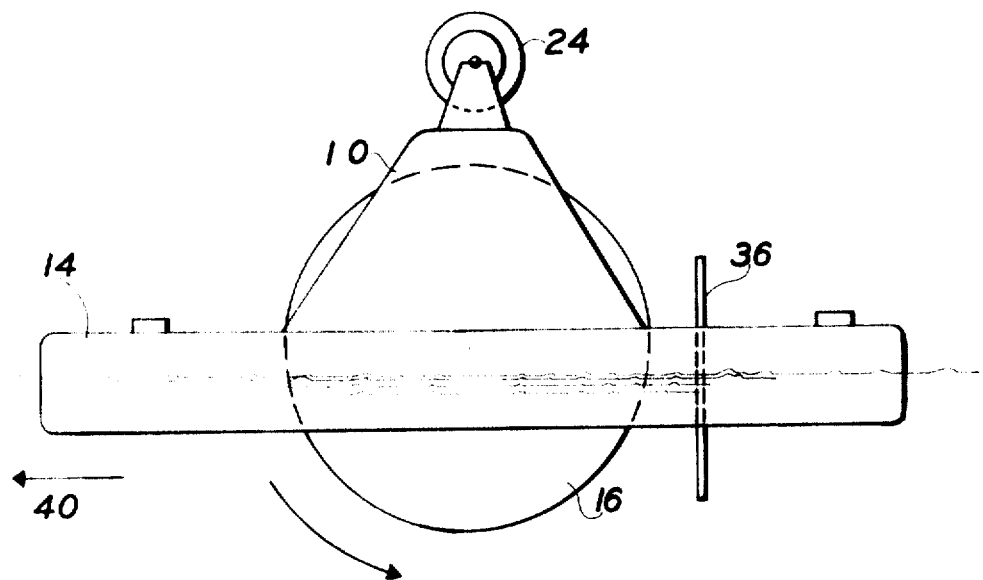
FIG. 3 is a side view of a frame and rotor.

FIG. 3 shows a side view of frame 10 and rotor 16. A baffle 36 is mounted on the frame parallel to the rotor axis and behind the rotor, with respect to the direction 40 of frame travel. Baffle 36 extends above and below the water surface and is designed to intercept the aerated water flung backward by the blades. It also helps to drive the aerated water below the lagoon surface and slows down the rate of aeration and frame travel. This ability to regulate the speed of the frame so that it is not a direct function of rotor speed is desirable because variations in the degree of pollution consistency of the liquid being treated require different treatment times.

Figure 4:
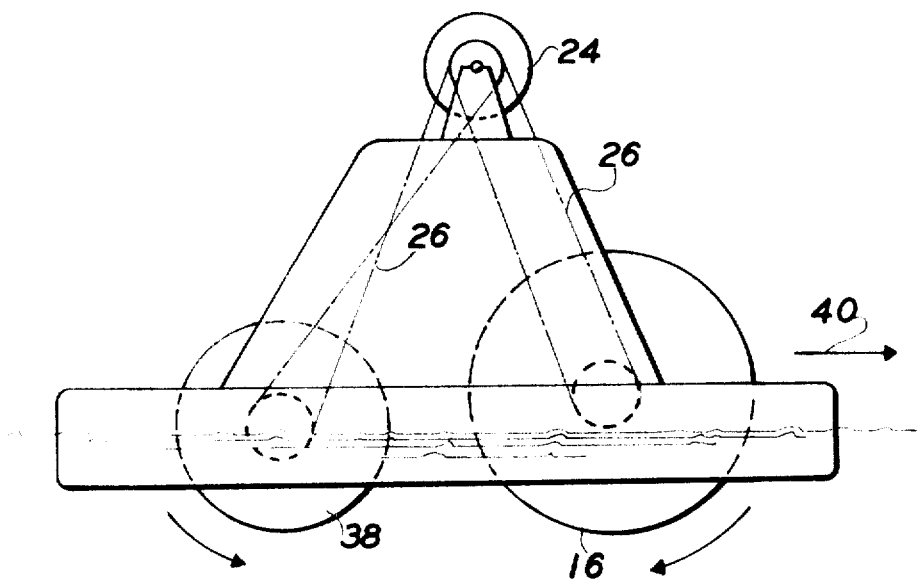
FIG. 4 is a side view of the frame on which two rotors are mounted.

A frame supporting two rotors is shown in FIG. 4. Rotor 38 revolves in the opposite direction of rotor 16 to allow frame 10 to travel in the direction 40. Rotor 38 is either made smaller than rotor 16 or is driven at a slower speed, or both. In either case, it provides increased drag and aeration of the water. An adjustable baffle, similar to that shown as item 36 in FIG. 3, may be mounted on the frame between the rotors to function both as a brake and an aid in projecting aerated water beneath the lagoon surface.

The drawings and specification present a detailed disclosure of the preferred embodiment of the invention, but it is to be understood that the invention is not limited to the specific form disclosed, but covers all alternative constructions and modifications falling within the scope of the principals taught herein and claims attached hereto.

I claim:

1. Apparatus for aerating water within a basin comprising, in combination:

a frame adapted to float in the water;
at least a pair of balded rotors, having longitudinal axes, rotatably mounted in said frame about their longitudinal axes, said blades extending radially from the longitudinal axes and projecting partially into the water;
adjustable speed power means connected to each of said rotors to rotate them and propel the frame about the basin;
guide means attached to said frame to direct it over a predetermined path on the water surface; and wherein one of said rotors is of a smaller diameter, as measured by the circular path traced by the blade tips, than the other rotor;
one of said rotors rotates in the opposite direction with respect to the other rotor, thereby creating resistance to the movement of said frame in the water.

2. Apparatus as set forth in claim 1, wherein: said guide means comprises
a. a pier anchored within the basin, and
b. adjustable cable means connecting said pier with said frame so as define the path traced by said frame as it travels through the water.

3. Apparatus for aerating water within a basin comprising, in combination:

a frame adapted to float in the water;
at least a pair of bladed rotors, having longitudinal axes, rotatably mounted in said frame about their longitudinal axes, said blades extending radially from the longitudinal axes and projecting partially into the water;
adjustable speed power means connected to each of said rotors to rotate them and propel the frame about the basin;
guide means attached to said frame to direct it over a predetermined path on the water surface;
the longitudinal axes of said rotors are parallel and in a horizontal plane; and wherein said rotors are positioned one behind the other, in the direction of frame travel;
an adjustable baffle means is mounted on the frame between the rotors, said baffle means extends into the water to reduce the speed of the frame and promote the projection of air beneath the surface.